United States Patent
McPherson

(10) Patent No.: US 9,701,847 B2
(45) Date of Patent: Jul. 11, 2017

(54) REINFORCED POWDER PAINT FOR COMPOSITES

(71) Applicant: MCP IP, LLC, Sparta, WI (US)

(72) Inventor: Mathew A. McPherson, Norwalk, WI (US)

(73) Assignee: MCP IP, LLC, Sparta, WI (US)

( * ) Notice: Subject to any disclaimer, the term of this patent is extended or adjusted under 35 U.S.C. 154(b) by 551 days.

(21) Appl. No.: 14/137,139

(22) Filed: Dec. 20, 2013

(65) Prior Publication Data

US 2014/0178672 A1 Jun. 26, 2014

Related U.S. Application Data

(60) Provisional application No. 61/745,103, filed on Dec. 21, 2012.

(51) Int. Cl.
| | |
|---|---|
| *C09D 163/00* | (2006.01) |
| *C08K 7/02* | (2006.01) |
| *C08L 77/10* | (2006.01) |
| *C09D 5/03* | (2006.01) |
| *C09D 7/12* | (2006.01) |

(52) U.S. Cl.
CPC ............. *C09D 5/033* (2013.01); *C08K 7/02* (2013.01); *C09D 7/1291* (2013.01); *C09D 163/00* (2013.01); *C08K 2201/004* (2013.01); *C08L 77/10* (2013.01); *Y10T 428/254* (2015.01); *Y10T 428/31511* (2015.04)

(58) Field of Classification Search
None
See application file for complete search history.

(56) References Cited

U.S. PATENT DOCUMENTS

| | | |
|---|---|---|
| 3,062,683 A | 11/1962 | Kalleberg et al. |
| 3,236,679 A | 2/1966 | Spiller et al. |
| 3,622,371 A | 11/1971 | Sparks |
| 4,010,057 A | 3/1977 | Nakanishi |
| 4,013,804 A | 3/1977 | Gruetzman |
| 4,055,706 A | 10/1977 | Galmiche et al. |
| 4,206,204 A | 6/1980 | Langford |
| 4,229,239 A | 10/1980 | Arai et al. |
| 4,436,571 A | 3/1984 | Nakanishi |
| 4,600,598 A | 7/1986 | Nelson et al. |
| 4,812,439 A | 3/1989 | Ohara et al. |
| 4,820,310 A | 4/1989 | Fukui |
| 4,861,663 A | 8/1989 | Sirinyan et al. |
| 4,894,241 A | 1/1990 | Chakrabarti et al. |
| 4,913,956 A * | 4/1990 | Fay ............... C08J 5/24 428/402 |
| 4,938,823 A | 7/1990 | Balazek et al. |
| 4,978,399 A | 12/1990 | Kodama et al. |
| 5,021,297 A | 6/1991 | Rhue et al. |
| 5,219,493 A | 6/1993 | Seshadri |
| 5,284,701 A | 2/1994 | Hamon |
| 5,308,426 A | 5/1994 | Claveau |
| 5,552,352 A | 9/1996 | Brun et al. |
| 5,585,155 A | 12/1996 | Heikkila et al. |
| 5,607,897 A | 3/1997 | Masuda |
| 5,618,589 A | 4/1997 | McFarland |
| 5,624,735 A | 4/1997 | Anderson et al. |
| 5,683,747 A | 11/1997 | Hamon |
| 5,707,955 A | 1/1998 | Gomes et al. |
| 5,795,844 A | 8/1998 | Evans et al. |
| 5,798,017 A | 8/1998 | Claveau |
| 5,830,541 A | 11/1998 | Carswell et al. |
| 5,866,051 A | 2/1999 | Lin et al. |
| 5,869,178 A | 2/1999 | Kusy et al. |
| 5,893,964 A | 4/1999 | Claveau |
| 5,962,368 A | 10/1999 | Poole |
| 5,962,546 A | 10/1999 | Everaerts et al. |
| 5,989,376 A | 11/1999 | Kusy et al. |
| 6,001,207 A | 12/1999 | Enlow et al. |
| 6,007,656 A | 12/1999 | Heikkila et al. |
| 6,106,944 A | 8/2000 | Heikkila et al. |
| 6,129,948 A | 10/2000 | Plummer et al. |
| 6,133,344 A | 10/2000 | Blatter et al. |
| 6,174,427 B1 | 1/2001 | Lundgard |
| 6,254,751 B1 | 7/2001 | Reiter et al. |
| 6,270,853 B1 | 8/2001 | Brown et al. |
| 6,314,704 B1 | 11/2001 | Bryant |
| 6,344,103 B1 | 2/2002 | Cheng et al. |
| 6,528,157 B1 | 3/2003 | Hussain et al. |
| 6,551,392 B1 | 4/2003 | Otaki et al. |
| 6,620,463 B2 | 9/2003 | Stay |
| 6,659,020 B1 | 12/2003 | Ball |
| 6,743,109 B2 | 6/2004 | Kammerer, Jr. et al. |
| 6,855,429 B2 | 2/2005 | Stay |
| 6,861,467 B2 | 3/2005 | Nakano |
| 6,866,706 B2 | 3/2005 | Ishida et al. |
| 6,872,273 B2 | 3/2005 | Davies et al. |
| 6,881,288 B2 | 4/2005 | Davies et al. |
| 7,077,926 B2 | 7/2006 | Goffi et al. |
| 7,093,638 B2 | 8/2006 | Bonaventura |
| 7,238,644 B2 | 7/2007 | Yukawa et al. |
| 7,393,811 B2 | 7/2008 | Chervin |
| 7,438,069 B2 | 10/2008 | Simonds |
| 7,798,017 B2 | 9/2010 | Betz |
| 2002/0007898 A1 | 1/2002 | Spica |
| 2002/0110682 A1 | 8/2002 | Brogan |
| 2003/0049451 A1 | 3/2003 | Stay |
| 2003/0106442 A1 | 6/2003 | Gosetti |

(Continued)

FOREIGN PATENT DOCUMENTS

| | | |
|---|---|---|
| CA | 2039054 | 10/1991 |
| CA | 2082979 | 5/1993 |
| EP | 0418066 | 3/1991 |
| GB | 1099713 | 1/1968 |
| TW | 558583 | 10/2003 |

*Primary Examiner* — Sheeba Ahmed

(57) ABSTRACT

A fiber reinforced powder paint provides improved flexural fatigue resistance for composites substrates. Fiber loading in the powder is greater than 40%. Aramid fiber loading in an epoxy based powder paint is exemplified. A composite bow limb coated with the powder paint survives a remarkably greater number of bending cycles before failure when coated with the powder paint.

12 Claims, 2 Drawing Sheets

(56) References Cited

U.S. PATENT DOCUMENTS

| | | |
|---|---|---|
| 2004/0241335 A1 | 12/2004 | Motzko et al. |
| 2005/0025306 A1 | 2/2005 | Lesniak et al. |
| 2005/0248649 A1 | 11/2005 | Farrell et al. |
| 2006/0021163 A1 | 2/2006 | Chervin |
| 2006/0025306 A1 | 2/2006 | Chervin |
| 2007/0141353 A1 | 6/2007 | Neitzke |
| 2007/0154685 A1 | 7/2007 | Ikeda et al. |
| 2007/0163057 A1 | 7/2007 | Bertele et al. |
| 2007/0163559 A1* | 7/2007 | Simonds ............... F41B 5/0026 124/23.1 |
| 2008/0190314 A1 | 8/2008 | Chou |
| 2010/0297422 A1 | 11/2010 | Lucas |
| 2011/0184110 A1 | 7/2011 | Tepe |

\* cited by examiner

REINFORCED POWDER PAINT FOR COMPOSITES

CROSS-REFERENCE TO RELATED APPLICATIONS

This Application claims the benefit of U.S. Provisional Patent Application No. 61/745,103, filed Dec. 21, 2012, the entire content of which is hereby incorporated herein by reference.

BACKGROUND OF THE INVENTION

Formulations that include fibers in powder coated primer or topcoat layers have been suggested in the art for providing chip resistance on steel substrates at elevated temperatures, or as non-skid coatings. See for instance U.S. Pat. No. 6,861,467; US 2002/0110682; US 2010/0297422; and US 2011/0184110.

U.S. Pat. No. 5,624,735 describes sheet molded compound articles formed of fiber reinforced compression molded thermoset polymer which have a machined edge. The machined edge and the bordering margin are degassed and then coated with a cured coalesced powder coating primer that tapers from the machined edge on the boarding margin to a primerless exterior surface. The primed edge minimizes surface defects in a subsequently applied top coat that are attributed to trapped gasses in the SMC article. This edge coating is said to provide improved finish results relative to an alternative priming technique described in U.S. Pat. No. 5,021,297 that applies primer to the entire exterior. There is no suggestion to use fiber in the edge primer.

In the field of Archery, use of fiber reinforced thermoset composite components in compound bows is well established. Typically such bows include a riser and flexible limbs formed from the composite that are attached to the riser. The riser may be made of metal or composite. These polymer matrix composites typically use unidirectional fibers in alignment with the bending axis of the arm. In many cases they must be machined after lay-up, at least the compression side of the arm to provide arms in a range of bending strengths and/or lengths to meet the requirements of different customers.

Since the 1970's a number of powder paints have been used to successfully coat both metal and composite archery bow components and provide an exceptionally durable and somewhat stronger finish as compared to liquid system finishes. Most successful are epoxy based powder painting systems, as they appeared to have better bonding to the substrates and more durability than did the polyester based powder systems when used in our application.

From experience at the time, it was learned that some composite bow limbs when coated with the epoxy powder paint exhibited substantially increased fatigue resistance testing as compared to the same composite bow limbs that had been coated with conventional liquid system paints. The bow limbs that benefited the most from the epoxy powder coating process were those that had gel coat machined from the outer layer of the composite material which resulted in exposing some of the reinforcement filaments on the outer surfaces of the limbs. This occurred when a bow limb billet composed of unidirectional reinforcement filaments was ground into to provide a desired shape and bending characteristic for a given bow limb design. Even though care was taken to limit the shaping of the bow limb and the cutting of the reinforcement fibers to the compressive side of the limb the result was still that a considerable number of the fibers/ filaments become exposed. The addition of the epoxy power coating to the limb effectively applied a well bonded protective layer over these fibers somewhat similar to the original epoxy gel coat sufficiently sealing the cut filament ends.

Single and double powder coating of ground to shape composite billets provided a durable product for the loads that were being applied to composite bow limbs for a number of years. However, the bow limbs being used on some of today's bows are being exposed to even higher demands in use and reliability. Consequently there exists a need to further improve the fatigue durability of machined composite bow limbs.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

SUMMARY OF THE INVENTION

In some aspects the present invention pertains to fiber reinforced thermoset composite articles having a powder coating on a portion thereof wherein also includes reinforcing fibers. Further aspects pertain to such fiber reinforced thermoset composite articles having machined surfaces and a cured powder coating on at least the machined surfaces thereof, wherein the powder coating includes reinforcing fibers therein.

In some aspects the invention pertains to manufactured article comprising a body formed of a fiber/resin composite material having a powder coating thereon wherein the powder coating includes at least 40 volume-% of chopped reinforcing fiber having a maximum dimension of 100 µm in the direction of elongation.

In at least some embodiments the fiber reinforced thermoset composite component is an archery bow limb.

Still further aspects pertain to a method of preparing fiber reinforced thermoset composite components with machined surfaces which comprises coating at least the machined surfaces with a powder coating comprising reinforcing fibers and curing the powder coating. In particular embodiment the method comprises the steps of:

preparing a fiber reinforced thermoset composite article;
machining surfaces on the article so as to expose ends of the reinforcement fiber;
forming a thermoset composite;
coating at least the machined surfaces with a powder coating comprising reinforcing fibers and a curable resin, and;
subjecting the powder coating to conditions to effect curing of the powder coating curable resin.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE PREFERRED EMBODIMENTS

Figure 1:
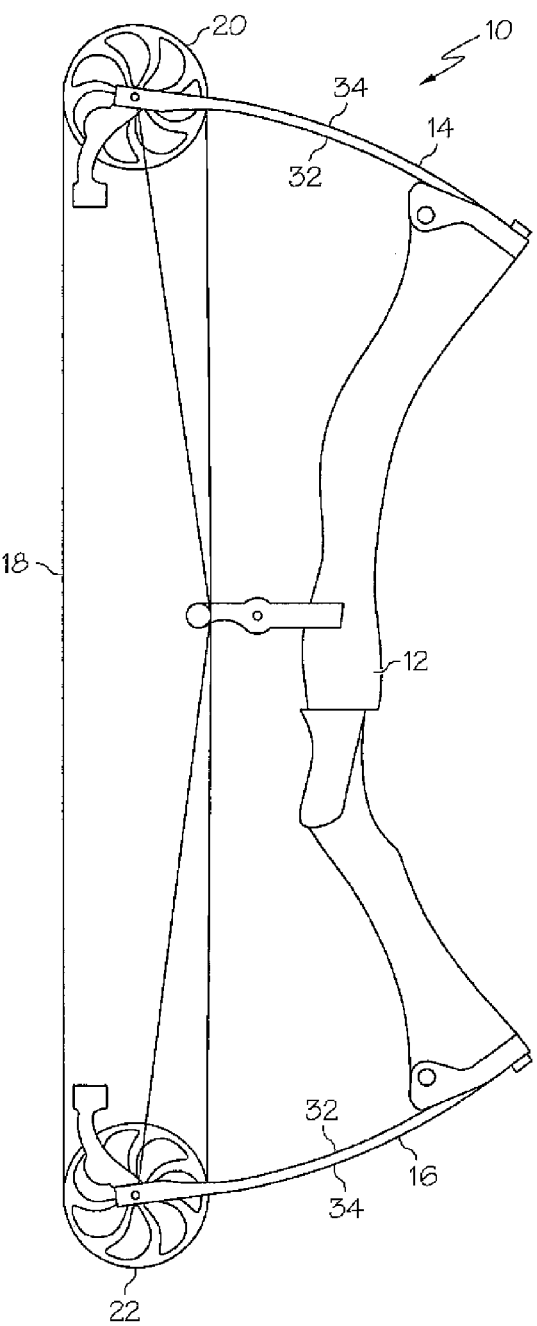
FIG. 1 shows an embodiment of an archery bow.

All published documents, including all US patent documents, mentioned anywhere in this application are hereby expressly incorporated herein by reference in their entirety. Any copending patent applications, mentioned anywhere in this application are also hereby expressly incorporated herein by reference in their entirety.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

The inventors have discovered that a modified powder coating can prevent early failure and substantially increase the number of cycles of bending loads under which a composite article such as a bow limb can be cycled without failure.

Other articles on which the invention may be advantageously employed include composite springs used in the food, paper, automotive, and furniture industries etc., boat hulls, racquets (e.g. tennis, handball or badminton racquets), paddles, oars, sailing masts, fishing rods, and various components of bicycles, automobiles, motorcycles and aircraft that are subjected to high flexural loads. The invention has particular advantage for composite articles subjected to unidirectional flexural loading, e.g. fiber/resin bow limbs and other composite springs. In particular, the invention has advantage for such articles which are machined in an area which is subjected to high loading stresses or which have a machined area near to an area subjected to high loading.

The invention in some embodiments provides a coating system that can be used to provide better protection of the areas of a bow limb where the unidirectional load bearing fiber composites have been cut and are near the highly stressed surfaces of the bow limb.

The powder coatings employed in the invention may be used as a primer or finish coat. In at least some embodiments the coating is employed as a primer and a decorative coating applied thereover.

Referring to FIG. 1 there is shown a compound bow 10. The bow includes riser 12, composite limbs 14, 16, bowstring 18, pulleys 20, 22, which may be assymetrically mounted or have cam portions. Each of the bow limbs include an inner surface 32 which is put in compression, and outer surface 34 that is put in tension when the bow string is mounted. These forces increase as the bow string is pulled back.

Figure 2:
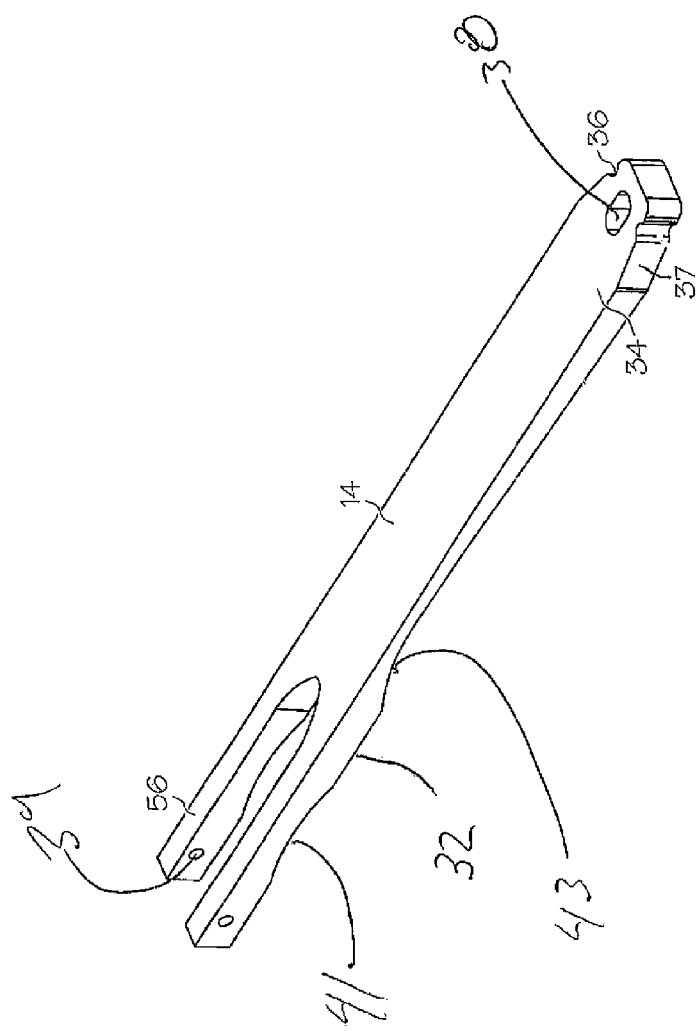
FIG. 2 shows an embodiment of a limb suitable for use in an archery bow.

FIG. 2 is a view of the bow limb 14 in its unstressed condition, before mounting on the bow. The limb is formed of a fiber-reinforced composite laid up with substantially all of the fibers extending in the longitudinal direction of the limb. Post-layup machining may be used to form end mating surfaces such as the bevel and notch surfaces 36, 37, and the mounting holes 38, 39.

On the compression side 32 material may be removed in area 41, to accommodate different pulley sizes and in arc 43, to reduce weight or to reduce the bending force needed to pull the bowstring to launch position. It is in these areas where the powder coatings of the invention have been shown to be particularly beneficial in lengthening the number of bending cycles to failure that the limbs will undergo in a test designed to monitor limb performance.

Coating the bow limb, after machining, with an epoxy powder paint primer is conventional in the art. The modern composite bows such as show in FIG. 1, however, are sometimes strung at high enough loads where the epoxy powder coatings of the prior art can fail in use, causing exposure of the end fibers and sometimes even failure of the composite limb.

The fatigue behavior of the coated bow limb can be tested by stress cycling repeatedly until a failure is evident on visual inspection, either of exposed broken fibers in the limb composite or of separation of the coating from the limb. Typically failure is first evident in on the previously machined compression side surfaces of the limb.

The invention replaces the prior art unreinforced power paint primer with another fiber filled composite material as a base coating to encapsulate the processed raw bow limb. This provides a coating that would not only seal all of the cut filaments in the processed billet but also add strength to that applied coating as well.

To differentiate the fiber of the composite material from those in the powder coating, the term "chopped" is applied to the coating fibers. The term is not to be understood as necessarily implying that they have been made in any particular way.

The powder coatings used in the inventive composites and method in some embodiments use chopped fiber in an amount that is at least about 45% by volume of the chopped reinforcing fiber. The chopped reinforcing fibers in the powder coating in some embodiments are polymer or carbon fibers. Preferred chopped fiber loadings in the powder coating are from about 45-80% by volume, for instance about 50-75% or about 60-70%.

Conventional approaches in the coating art to failure under flexure would have sought to increase coating adhesion and/or its elasticity. High filler loadings in coatings can reduce coating/substrate adhesion, for instance by reducing the substrate whetting prior to cure. Furthermore, not just the fiber ends in the machined surface of the article, but also the fibers in the coating itself, are subjected to compression stress when the bow is strung and pulled. Therefore it was not clear that failure under flexure could be expected to be improved in this way. Consequently the results obtained are considered quite surprising.

The exceptional bonding characterizes, ease and uniformity of application of epoxy powder painting a preferred choice as the vehicle on which to base this new concept. The skilled person however will understand that other powder paints which are effective coatings for particular composite articles may be employed without departing from the scope of the invention.

As the thermosetting base polymer in the powder paint of the present invention, an epoxy resin having at least one epoxy group in its molecule is preferably employed. The epoxy resin is not particularly restricted as long as it is an epoxy resin having at least one epoxy group in its molecule, and is exemplified by glycidyl ether type epoxy resins, for example, glycidyl ether of bisphenol A, glycidyl ether of bisphenol F, glycidyl ether of bisphenol AD, glycidyl ether of resorcin, glycidyl ether of glycerin, glycidyl ether of polyalkylene oxide, glycidyl ether of brominated bisphenol A, oligomers thereof; epoxidized products of condensates of phenols, orthocresols and/or naphthols or the like and formalins, aliphatic or aromatic aldehydes or ketones, typified by glycidyl ether of phenol novolac and the like; stilbene type epoxy resins, biphenyl type epoxy resins, alicyclic epoxy resins such as alicyclic diepoxyacetal, alicyclic diepoxyadipate and alicyclic diepoxycarboxylate; and linear aliphatic epoxy resins typified by epoxidized polybutadiene. Examples of other epoxy resins include glycidyl ester type epoxy resins, for example, diglycidyl phthalate ester, diglycidyl tetrahydrophthalate ester and diglycidyl hexahydrophthalate ester and the like; glycidylamine type epoxy resins, for example, N,N-diglycidylaniline and tetraglycidylaminodiphenylmethane; heterocyclic epoxy resins, hydantoin type epoxy resins, triglycidyl isocyanurate, silicone-modified epoxy resins, urethane-modified epoxy resins, and polyimide- or polyamide-modified epoxy resins. These epoxy resins may be used in combination.

A particularly suitable powder paint is a polyester triglycidyl isocyanurate from Innovative Powder Coatings LLC (Pennauken, N.J., USA).

In some embodiments the epoxy resin may have an epoxy equivalent of, for instance 150 to 2500. The choice of specific resin and equivalent weight will be influenced by the needed flexibility and strength properties of the cured primer coating film, as well as other properties such as handleability, workability, impact resistance and the like.

In the present invention, a curing agent is added as needed, to the thermosetting resin. When an epoxy resin is used as the thermosetting resin, a solid curing agent generally employed as a curing agent for epoxy resin may be added thereto. Exemplary are dicyanodiamides, imidazoles, phenolic curing agents and dicarboxylic acid anhydrides. Specific examples thereof include aliphatic acid anhydrides; alicyclic acid anhydrides; aromatic acid anhydrides; halogenated acid anhydrides; trisphenols; phenol novolac; cresol novolac; bisphenol A novolac; bisphenol F novolac; phenols-dicyclopentadiene polyaddition type resins; dihydroxynaphthalene novolac; polyhydric phenols having xylidene as a binding group; phenol-aralkyl resins, naphthols, polyamide resins and modified products thereof; methylol group-containing initial condensates obtained by allowing phenol, urea, melamine or the like to react with formalin; basic active hydrogen compounds typified by dicyandiamide; tertiary amines such as tris (dimethylaminomethyl)phenol; salts of Lewis acids and Brönsted acids, such as imidazole, BF3-amine complexes; polymercaptan type curing agents; isocyanates or blocked isocyanates; and organic acid dihydrazides. Further, these curing agents may be used in combination.

The curing agent is chosen to produce a product that remains thermoplastic under conditions used for producing and applying the powder, typically 212-266° F. (100-130° C.), and yet reactive to cure when heated to a temperature in the range of about 320-464° F. (160-240° C.). The cure time is suitably in the range of 0.5 min-14 hrs, depending on the temperature employed, for instance 5-25 min. at 385° F. (196° C.).

In some embodiments, the resin is cured at a minimum temperature of 265° F. for 30 minutes and then heated to 400° F. for 4 minutes.

In some embodiments, the resin is cured at 325° F. for 20 minutes.

The chopped fiber should have a size and aspect ratio that allows it to be mixed in with the epoxy powder in a manner that would allow the powder paint to be applied in the normal fashion while carrying the reinforcement filaments with it.

A number of different common reinforcement materials may be used as the chopped fiber in this invention. The chopped fiber filaments may be inorganic and/or organic material. Because each type of fiber has its own specific advantages and properties, a suitable one may be selected by one of skill in the art in some embodiments chopped fibers of glass, carbon, graphite, metal, aramid, ultra high molecular weight polyethylene, polyacrylonitrile, arylate, or polyether ether ketone may be used for the present invention. In at least some embodiments the chopped fibers are carbon or aramid. In some embodiments the chopped fibers are selected from the group consisting of carbon, glass, ultra high molecular polyethylene fibers, for instance those sold under the trademarks Spectra® (Honeywell) and Dyneema® (DSM), and aramid fibers such as sold under the trademarks Kevlar® (from DuPont) and Twaron™ (Teijin Aramid).

A specific example of a fibrous material useful herein includes, but is not limited Kevlar® Pulp, part #—544 available from Fibre Glast Developments Corporation in Brookville, Ohio.

Chopped carbon or aramid fibers an average "minor" dimension (taken as diameter in the case of substantially circular cross-section fibers or as the maximum dimension in a direction perpendicular to the direction of elongation in the case of non-circular cross-section) of about 0.5 to 50 nm, more suitably 0.5 to 20 nm and most suitably about 0.7 to 15 nm and an average length of about 0.5 to 100 µm may be used. In some embodiments the chopped fibers have a length of about 0.5 to 100 µm, and more suitably bout 0.5 to 20 µm, and an aspect ratio of 10-500 may be used, suitably greater than about 50 and more suitably greater than about 100.

Other components of the paint may be degassing agents, flow modifiers, adhesion promoters, surfactants or other agents to control dry flow properties of the powder paint and the like. Anticorrosive agents may be added if the paint is also used on corrodible substrates such as aluminum or steel.

In some embodiments the powder coating formulation before addition of the chopped fiber may be a clear resin, in others it may include a pigment, for instance gray, black or white.

If the powder paint primers of the invention are also used to coat metal components, a pretreatment of the metal may be desirable. For instance conventional iron phosphate pretreatment of aluminum may be employed prior to application of the primer.

The chopped fibers are suitably formulated with powder coating resin under conditions that allow the material to flow but not cure, and then comminuted into a size suitable for application as a powder coating, for instance by cooling to a temperature at which the coating is brittle and pulverizing or grinding. Alternative methods for forming power coating particles are known to the skilled formulator and may be used without departing from the invention hereof.

The fiber/resin composite forming the body of the article may be short or long fiber reinforced material. In some embodiments may be a cured SMC (sheet molding compound). The reinforcement may be fabric or braid or weave or fiber roving. In some preferred embodiments it is a fiber layup which has substantially fibers substantially unidirectionally oriented. The fibers of the fiber/resin composite may suitably be long or short fibers. In some embodiments the composite fibers are suitably long fibers of length of at least 10 mm. These fibers are produced in long filament form and are cut to the desired length depending on the article in which they are employed.

In bow limbs, as well as other articles of manufacture, for instance, it is desirable to have the fiber run the entire length of the bow limb.

Table 1 summarizes features of suitable and preferred parameters of the powder coatings of the invention.

TABLE 1

|  | Range | Preferred |
|---|---|---|
| Chopped fiber length | 0.5-100 µm | 0.5-20 µm |
| Aspect ratio (length/ minor dimension) | 5-1000 |  |
| Powder paint particle size | 5-200 µm | 45 µm |
| Fiber content | 33-75% | 60-70% |
| Fillers/pigment | 0-10% | <2% |
| coating thickness | 10-1000 µm | 2-4 mil (50-100 µm) |
| Specific gravity | 1-1.5 | 1.2 |

The resin matrix of the composite may be any polymeric material that can withstand the powder paint cure cycle. Typically cured thermoset formulations will be used, for instance thermoset formulations based on epoxy, acrylic, urethane, polyimide cure chemistries. In some preferred embodiments the matrix is a thermosetting epoxy system.

However, thermoplastic materials can also be employed in the present invention. This allows repair of the articles by melting and remolding. Compositions of this type are disclosed in commonly assigned U.S. Pat. No. 7,438,069, the entire content of which is incorporated herein by reference.

As an example, bow limbs can be formed by building up layers of reinforcing fibers and preimpregnating the fibers with a thermoplastic resin added over a core of thermoplastic material to make a preform, and then compression molding the entire assembly.

In some embodiments the composite article after curing, is machined and the inventive coatings applied to at least the machined surface. In some cases the composite article is coated over its entirety with the inventive coating. The coatings of the invention typically provide a matte finish. After the inventive powder coating has been applied and cured it may be overcoated with decorative coatings such as camouflage patterns, gloss or matte colors, metalized coatings or the like.

The invention is illustrated by the following non-limiting examples.

Example 1, Aramid Chopped Fibers

A formulation was prepared using finely ground Kevlar™ fiber being used as the reinforcement material. The powder paint contained 66% by volume Kevlar™ chopped fiber. The fiber had a length in the range of 5-20 µm and diameter of about 45 µm.

Kevlar® was incorporated into the paint particles, premixed, extruded and then milled to size.

Bow limbs coated with the standard epoxy powder paint, a polyester triglycidyl isocyanurate available from Innovative Powder Coatings, LLC were run on a fatigue testing machine and showed signs of failure on the high stressed surfaces of the bow limb after a period of 25 hours of continuous flexing. The bow limb test samples that were coated with the 66% Kevlar™ epoxy powder paint were subjected to the same fatigue testing and ran between 100 and 120 hours before showing any indication of surface failures.

In various embodiments, an article or method is described by the following paragraphs:

1. A manufactured article comprising a body formed of a fiber/resin composite material having a powder coating thereon wherein the powder coating includes at least at least 40 volume-% of chopped reinforcing fiber.

2. The manufactured article as in paragraph 1 wherein the chopped reinforcing fiber has a maximum dimension of 100 µm in the direction of elongation.

3. The manufactured article as in paragraph 1 or 2 wherein the average particle size of the powder coating is about 5 µm to about 200 µm.

4. The manufactured article as in any of paragraphs 1, 2 or 3 wherein the average particle size is about 45 µm and the maximum dimension of the chopped reinforcing fiber in the direction of elongation is 20 µm.

5. A manufactured article as in any of paragraphs 1-4 wherein the fiber/resin composite material is a composite comprising an epoxy resin and fibers having a length of 10 mm or less and selected from the group consisting of glass, carbon, aramid or ultrahigh molecular weight polyolefin fibers and mixtures thereof.

6. A manufactured article as in any of paragraphs 1-5 wherein in normal use of the device the article is an elongated structure subject to substantial bending stresses applied transverse of the direction of elongation.

7. A manufactured article as in any one of paragraphs 1-6 wherein the article is a member of the group consisting of archery bow components, composite springs, boat hulls, paddles, oars, sailing masts, rackets, fishing rods, and various components of bicycles, automobiles, motorcycles and aircraft that are subjected to high flexural loads.

8. A manufactured article as in paragraph 7 wherein the article is an archery bow limb.

9. A manufactured article as in any one of paragraphs 1-8 wherein the article includes a surface coated by said powder coating which, before application of the powder coating, had exposed fiber ends of said composite material.

10. A manufactured article as in paragraph 9 wherein said exposed fiber ends were produced by machining the composite material.

11. A manufactured article as in any of paragraphs 1-10 wherein the chopped fibers have a minor dimension which is the maximum dimension in the direction perpendicular to the direction of elongation which is in the range of 0.7 to 15 nm.

12. A manufactured article as in any of paragraphs 1-11 wherein the chopped fibers in the powder coating are selected from the group consisting of carbon, aramid or ultrahigh molecular weight polyolefins.

13. A fiber reinforced composite article, wherein said article is an archery bow limb having a side under compression when the limb is in use, and at least a machined surface portion of the compression side where material of the composite had been removed to expose fiber ends, and a powder coating on at least said machined surface portion, wherein the powder coating comprises a powder coating resin and at least 40% by weight of chopped fibers having a length in the direction of elongation less than the size of the applied powder coating particles.

14. A fiber reinforced polymeric composite article comprising a composite substrate comprising substantially unidirectional fibers in an epoxy resin matrix and an epoxy resin powder coating, wherein the powder coating further comprises a chopped reinforcing fiber.

15. An article as in any one of paragraphs 13 or 14 wherein the chopped fibers in the powder coating are selected from the group consisting of carbon, aramid or ultrahigh molecular weight polyolefins.

16. An epoxy resin powder paint formulation wherein the formulation comprises at least 40% by volume of a chopped reinforcing fiber.

17. The epoxy resin powder paint formulation as in paragraph 16 wherein the chopped fibers in the powder coating are selected from the group consisting of carbon, aramid or ultrahigh molecular weight polyolefins.

The above examples and disclosure are intended to be illustrative and not exhaustive. These examples and description will suggest many variations and alternatives to one of ordinary skill in this art. All these alternatives and variations are intended to be included within the scope of the claims, where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A fiber reinforced composite article, wherein said article is an archery bow limb comprising a thermoset material, said archery bow limb having a side under compression when the limb is in use, and at least a machined surface portion of the compression side where material of the composite had been removed to expose fiber ends, and a powder coating on at least said machined surface portion, wherein the powder coating comprises a resin particles and at least 40% by weight of chopped fibers, the chopped fibers having a length in the direction of elongation less than the size of the resin particles.

2. The article as in claim 1 wherein the chopped fibers have a minor dimension which is the maximum dimension in the direction perpendicular to the direction of elongation which is in the range of about 0.7 to 15 nm.

3. An archery bow comprising:
   a riser;
   a first limb supporting a first pulley;
   a second limb supporting a second pulley;
   a bowstring extending between the first pulley and the second pulley;
   wherein the first limb comprises a thermoset composite material and a cured coating formed from a powder coating comprising polymer powder and chopped reinforcing fibers, said chopped reinforcing fibers having a maximum dimension of 100 μm, said chopped reinforcing fibers comprising 40 volume-% of said powder coating.

4. The archery bow of claim 3, wherein the second limb comprises a thermoset composite material and a cured coating formed from a powder coating comprising polymer powder and chopped reinforcing fibers, said chopped reinforcing fibers having a maximum dimension of 100 μm, said chopped reinforcing fibers comprising 40 volume-% of said powder coating.

5. The archery bow of claim 3, wherein the cured coating has a thickness of 1000 μm or less.

6. The archery bow of claim 3, wherein an average particle size of the polymer powder is about 5 μm to about 200 μm.

7. The archery bow of claim 3, wherein an average particle size of the polymer powder is about 45 μm and the maximum dimension of the chopped reinforcing fiber in the direction of elongation is 20 μm.

8. The archery bow of claim 3, wherein the thermoset composite material comprises an epoxy resin and fibers having a length of 10 mm or more and selected from the group consisting of glass, carbon, aramid or ultrahigh molecular weight polyolefin fibers and mixtures thereof.

9. The archery bow of claim 3, wherein said cured coating covers a surface of said thermoset composite material having exposed fiber ends.

10. The archery bow of claim 9, wherein said exposed fiber ends were produced by a process of machining the thermoset composite material.

11. The archery bow of claim 3, wherein the chopped reinforcing fibers are selected from the group consisting of carbon, aramid or ultrahigh molecular weight polyolefins.

12. The archery bow of claim 3, wherein the chopped reinforcing fibers have a minor dimension which is the maximum dimension in the direction perpendicular to the direction of elongation which is in the range of about 0.7-15 nm.

* * * * *